(12) United States Patent
Evrard

(10) Patent No.: US 7,172,406 B2
(45) Date of Patent: Feb. 6, 2007

(54) INSTALLATION FOR BLOW MOLDING THERMOPLASTIC POLYMER CONTAINERS

(75) Inventor: Alain Evrard, Octeville-sur-Mer (FR)

(73) Assignee: Sidel, Octeville-sur-Mer (FR)

( * ) Notice: Subject to any disclaimer, the term of this patent is extended or adjusted under 35 U.S.C. 154(b) by 128 days.

(21) Appl. No.: 10/486,093

(22) PCT Filed: Dec. 9, 2002

(86) PCT No.: PCT/FR02/04230

§ 371 (c)(1),
(2), (4) Date: Apr. 26, 2004

(87) PCT Pub. No.: WO03/049922

PCT Pub. Date: Jun. 19, 2003

(65) Prior Publication Data

US 2004/0202747 A1    Oct. 14, 2004

(30) Foreign Application Priority Data

Dec. 13, 2001    (FR)    ................................. 01 16109

(51) Int. Cl.
*B29C 49/58*    (2006.01)
(52) U.S. Cl. ...................... 425/535; 425/812
(58) Field of Classification Search ............... 425/535, 425/812; 65/261
See application file for complete search history.

(56) References Cited

U.S. PATENT DOCUMENTS

| | | | | |
|---|---|---|---|---|
| 3,390,425 A | * | 7/1968 | Sheptak | 425/525 |
| 3,806,300 A | * | 4/1974 | Hafele et al. | 425/525 |
| 3,989,786 A | * | 11/1976 | Mehnert et al. | 264/536 |
| 4,903,852 A | * | 2/1990 | Masumoto | 220/675 |
| 6,464,486 B1 | * | 10/2002 | Barray et al. | 425/535 |

FOREIGN PATENT DOCUMENTS

| | | | |
|---|---|---|---|
| EP | 599078 A1 | * | 6/1994 |
| FR | 2 764 544 A1 | | 12/1998 |
| FR | 2 790 704 A1 | | 9/2000 |
| FR | 2848905 A1 | * | 6/2004 |
| WO | WO 01 02157 A1 | | 1/2001 |

* cited by examiner

*Primary Examiner*—Robert B. Davis
(74) *Attorney, Agent, or Firm*—Sughrue Mion, PLLC

(57) ABSTRACT

An installation for blow molding thermoplastic polymer containers, including a blowing mold consisting of two portions capable of being assembled and a blowing device with a bell-type nozzle pressed in a sealed manner against a front mold surface mounted on the neck of a blank to be blow molded; a leaking device with a relatively large cross-section which extends from one contact surface of at least one mold portion up to the outside of the mold beyond the support of the bell of the nozzle on the surface. The high pressure blow molding fluid which can penetrate through an interstice between the mold portions which tend to be spaced apart from each other is at least mostly evacuated outside.

10 Claims, 4 Drawing Sheets

INSTALLATION FOR BLOW MOLDING THERMOPLASTIC POLYMER CONTAINERS

FIELD OF THE INVENTION

The present invention relates to improvements made to installations for blow-molding (including those for stretch-blow-molding) containers, particularly bottles, from parisons made of thermoplastic polymer such as PET, this installation comprising:

on the one hand, at least one blowing mold comprising two mold portions that can be brought together so that they touch via respective contact faces and then define at least part of the molding cavity opening onto one face of the mold via a neck passage able to receive the neck of the parison which is able to rest, via an annular flange, against said face of the mold, and, on the other hand, blowing means including a blowing nozzle of the bell type able to be brought to bear frontally in a sealed manner against said face of the mold, sitting over the neck of the parison, said two mold portions being able to move apart during the blowing under the effect of the pressure of the blowing fluid with the formation of a gap between the aforesaid contact faces of the two mold portions.

DESCRIPTION OF THE PRIOR ART

A blow-molding installation such as the aforesaid is, for example, described and depicted in document FR-A-2 764 544 in the name of the Applicant Company. In FIGS. 1 and 2 of the attached drawings to which reference will now be made, only the parts of such an installation most specifically involved in the present invention have been depicted. FIG. 1 is a view from above of part of a mold of this known installation and FIG. 2 is a side view in section of part of said mold with which part of the blowing nozzle is functionally associated.

The blow-molding mold 1 comprises two mold portions 2 which are, for example, articulated so that they rotate one with respect to the other (hinged mold). The mold 1 may have any desirable overall structure, in particular the two portions 2 may be arranged in the form of half-shells supported, removably, in rigid frameworks (not depicted). Each portion 2 is internally hollowed with an imprint 3 and the two imprints combined, when the mold is in the closed position, define a cavity 5 exhibiting at least part of the shape of the container that is to be obtained. In the closed position, the two portions 2 bear against one another via their contact faces that form a parting line 4.

In some cases, the complete cavity is defined by the two mold portions; however, in most cases, the two mold portions define only part of the cavity, which is supplemented by an additional imprint provided in a mold bottom: this structure facilitates release of the containers from the mold.

The molding cavity 5 is extended upward by a narrower neck passage 6 which opens onto a face (in this instance the upper face) F of the mold. The neck passage 6 is arranged and shaped, particularly in terms of its dimensions, to be able to accommodate the neck 9 of the parison 7 that is to be blow-molding. In FIG. 2, the parison 7 (depicted in the form of a preform) has its body 8 engaged in the molding cavity 5 and its neck 9 engaged in part in the passage 6 and for the rest protrudes above the face F of the mold, resting thereon via its flange 10.

The face F has, bearing in a sealed manner frontally against it, the widened part or bell 11 of a blowing nozzle 12, the bell 11 being equipped with a frontal annular seal 13.

In general, the blowing of the parison 7 is accompanied via an axial stretching obtained by a moving rod fitted through the nozzle 12 and the neck 9 of the parison, which rod has not been depicted in FIG. 2 in order to make the drawing easier to understand.

The blow-molding of the parison is performed by injecting a fluid (theoretically air) at high pressure (for example typically $40 \times 10^5$ Pa).

Under the effect of this high blow-molding pressure, it is possible for the two mold portions 2 to part slightly from one another, and for a gap 14 therefore to appear between their respective contact faces, as illustrated in FIGS. 3 and 4 which have been drawn to correspond to FIGS. 1 and 2 respectively. In FIGS. 3 and 4, the width of the gap 14 between the two portions has been deliberately enlarged considerably so that the drawings are easier to understand; however, in practice, it is very small (typically for example of the order of 0.05 mm).

However, although small, this gap is enough for high-pressure blowing fluid to be able to get into the parts 15 of this gap lying between the neck 9 of the parison and the seal 13 of the bell 11 (the parts hatched in FIG. 3 to make them easier to understand). The result of this is that fluid enters between the wall of the molding cavity 5 and the body 17 of the container 19 which is in the process of being formed without having yet come into contact with the wall of the molding cavity 5. This fluid cannot be discharged in its entirety as the body 17 of the container develops while it is forming under the effect of the blowing, and a pocket of fluid may remain, particularly at the shoulder of the container, as illustrated at 16 in FIG. 4: the body 17 of the definitive container 19 then has a local anomaly of shape (dish) 18 which is unacceptable and leads to the container being scrapped.

SUMMARY OF THE INVENTION

It is therefore an object of the invention to remedy this disadvantage, it being nonetheless emphasized that the invention does not seek to find a solution to prevent the parting of the mold portions (there are various known solutions for this, for example the one that consists in subjecting the rear face of each mold portion to a fluid back pressure of roughly the same magnitude as the blowing pressure): the invention is aimed solely, it being accepted that there will be some parting of the portions, at proposing a solution that attempts to avoid malformation of the containers finally obtained, said solution having to prove simple and inexpensive to implement and having to be able to be performed on existing installations.

To these ends, the invention proposes an installation for the blow-molding of containers as mentioned in the preamble and which, arranged in accordance with the invention, is characterized in that leakage means of relatively large cross section (when considered by comparison with the cross section offered to the fluid by the aforesaid gap) are provided from at least one contact face of at least one mold portion and extending as far as the outside of the mold beyond the seating for the bell of the blowing nozzle, by virtue of which contrivance the high-pressure blowing fluid that can enter the gap is removed at least for the most part by said leakage means and only a small proportion at most of said fluid can, at a relatively low pressure, get as far as the molding cavity.

The fraction of fluid that may reach the molding cavity is then at a very low pressure (a few $10^5$ Pa) and cannot impede the correct development of the wall of the container against the entire surface of the molding cavity: thus it can be guaranteed that containers of a correct shape will be obtained in spite of the parting of the mold portions during the blow-molding process. As a preference, leakage means are made from at least one contact face of at least one mold portion on each side of the molding cavity.

Advantageously, it is simple and economical for the leakage means to comprise at least one channel hollowed out from the contact face of at least one mold portion between the inside and the outside of the seating for the blowing nozzle of bell type, said channel being blind at its interior end. As a preference, in this case, the leakage means comprise at least two channels hollowed out respectively from the facing contact faces of the two mold portions.

In order to obtain an effective effect, it is desirable for the leakage means to have a cross section approximately 10 times as great as the cross section offered to the passage of the blowing fluid by the part of the gap over which the bell sits. Thus, in order to give a concrete example, if the two edges of the mold portions part from one another by about 0.05 mm, the passage cross section offered to the blowing fluid in this gap may typically be of the order of 0.75 mm$^2$; by giving the channels a cross section of about 7 mm$^2$ (diameter of the order of 3 mm), a ratio relating to the sections of the order of 10 is obtained. Thus, for a blowing pressure of about $40\times10^5$ Pa, the fraction of blowing fluid likely now to get as far as the blowing cavity has a pressure of the order of $4\times10^5$ Pa. This pressure is not high enough for a gas bubble likely to lead to localized malformation of the thermoplastic wall to become formed between the wall of the blowing cavity and said thermoplastic wall of the container while it is developing under the action of the blowing.

To optimize the efficiency of the means employed according to the invention, it is preferable for the pressurized fluid to be removed as quickly as possible as soon as it has entered the gap. For this, provision is made for the leakage means to be situated near the aforesaid face of the mold, and then preferably the leakage means are provided more or less at the aforesaid neck passage able to accommodate the neck of the parison.

In blow-molding installations employing mold portions made of aluminum, problems of sealing (particularly due to wear) may arise between the bell of the nozzle and the aforesaid aluminum face F. To set aside this disadvantage it is known practice for the face of the mold to be equipped with a steel neck plate pierced with a passage hole for the neck of the parison and against which the bell nozzle is brought to bear frontally in a sealed manner during blowing. Furthermore, this neck plate is removable so that, by swapping plates provided with passages of different diameters, it is possible to blow-mold containers which have necks of various diameters without there being a need to change the mold. Said neck plate is formed of two neck half-plates borne respectively via the upper faces of the two portions. In this case, provision is made, according to the invention, for the leakage means to be arranged in said neck plate.

Advantageously then, the leakage means comprise two channels hollowed out from the contact face of at least one neck half-plate, one on each side of the half-passage it comprises, each channel being blind at its inner end and, at its other end beyond the seating of the bell nozzle, communicating with a transverse well opening into the upper face of the half-plate. In a simple embodiment, the transverse well is defined by a notch hollowed out from the end of said contact face of the neck half-plate in the corner where said contact face meets the adjacent edge face.

BRIEF DESCRIPTION OF THE DRAWINGS

The invention will be better understood from reading the detailed description which follows of certain preferred embodiments which are given purely by way of illustration. In this description, reference is made to the attached drawings in which.

DETAILED DESCRIPTION OF THE DRAWINGS

Figure 1:
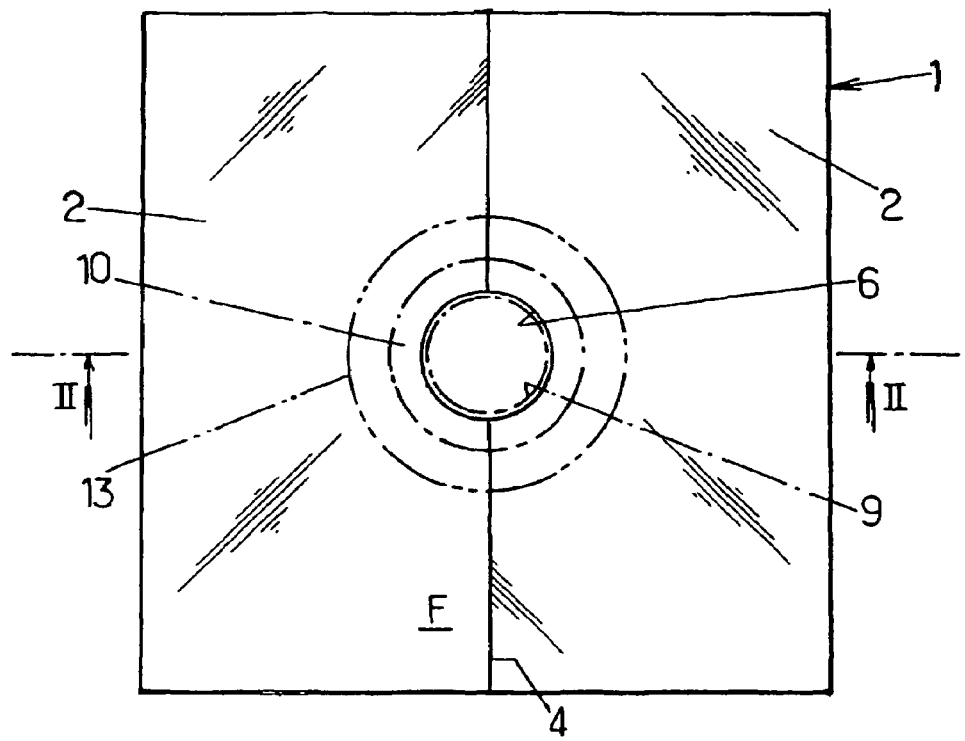
FIG. 1 is a schematic view from above of a mold arranged according to the prior art.
Figure 2:
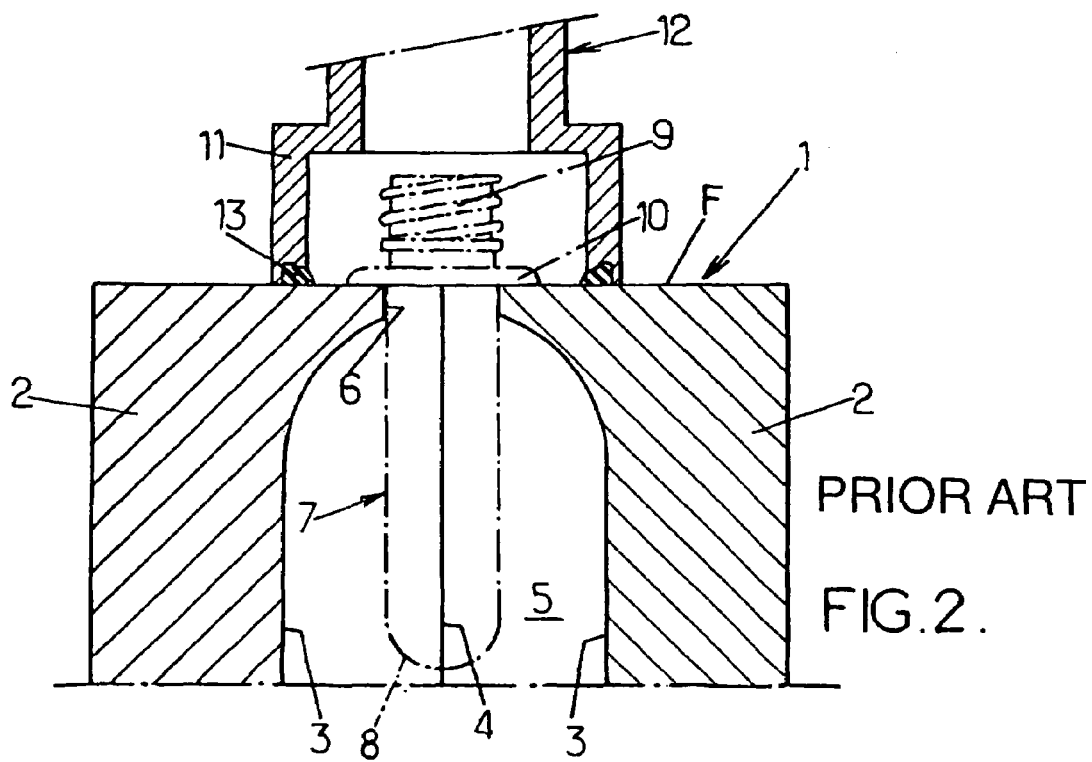
FIG. 2 is a schematic side view in section on II—II of the upper part of the prior art mold of FIG. 1, with a blowing nozzle resting on said mold and with a preform inside said mold.
Figure 3:
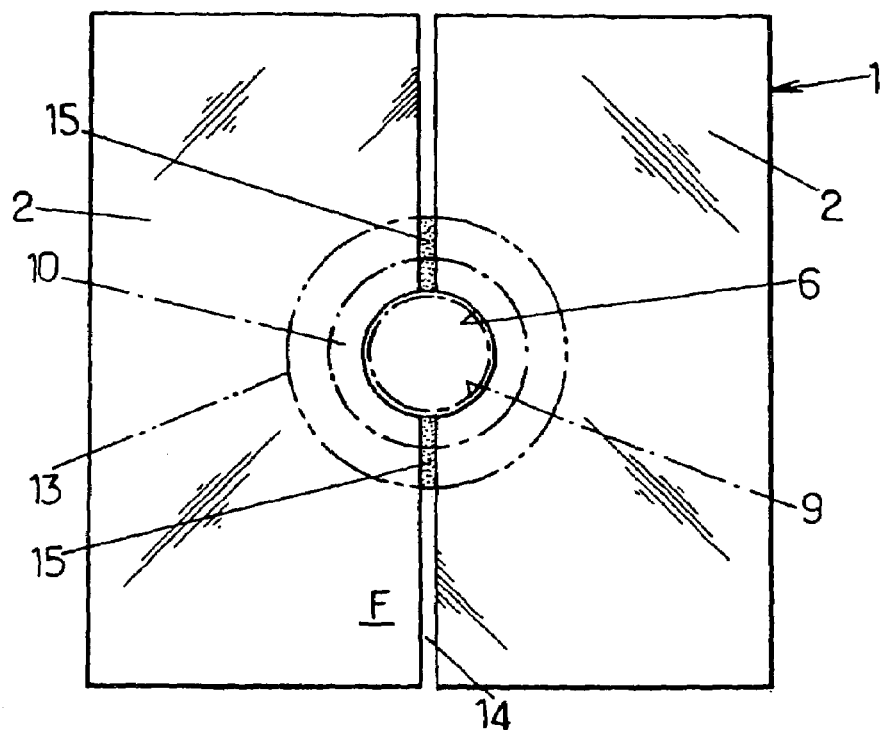
FIG. 3 is a schematic view of the prior art mold of FIG. 1 shown during the blowing step.
Figure 4:
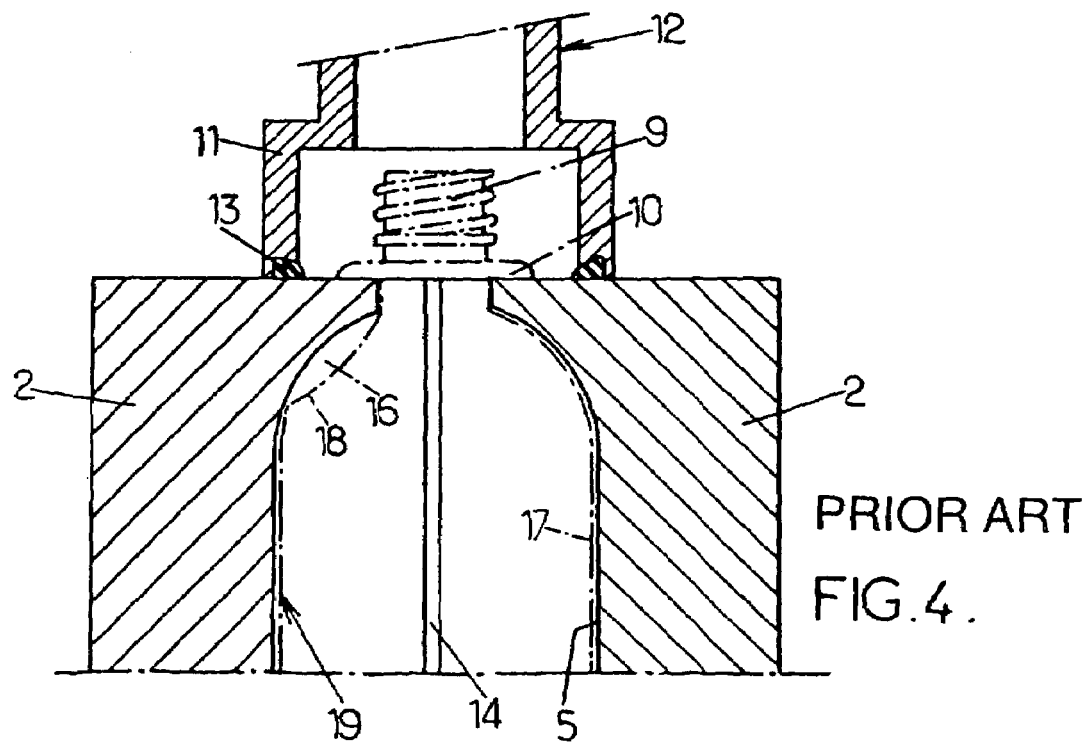
FIG. 4 is a schematic side view corresponding to the view of FIG. 2 with the preform being blown into a container.
Figure 5:
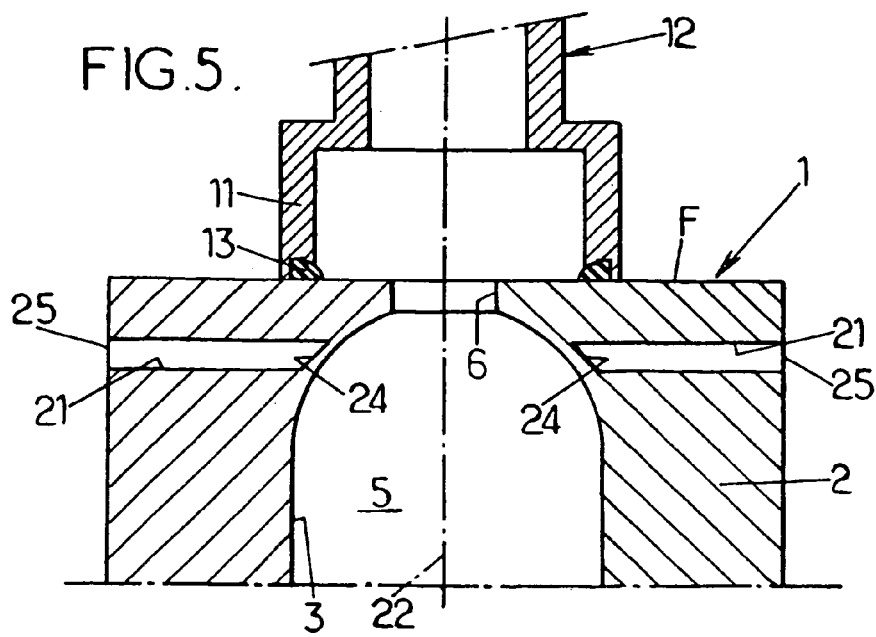
FIG. 5 is a part view in section on V—V of FIG. 6, of a mold portion, with the bell nozzle in the blowing position, illustrating one embodiment of the arrangements of the invention.
Figure 6:
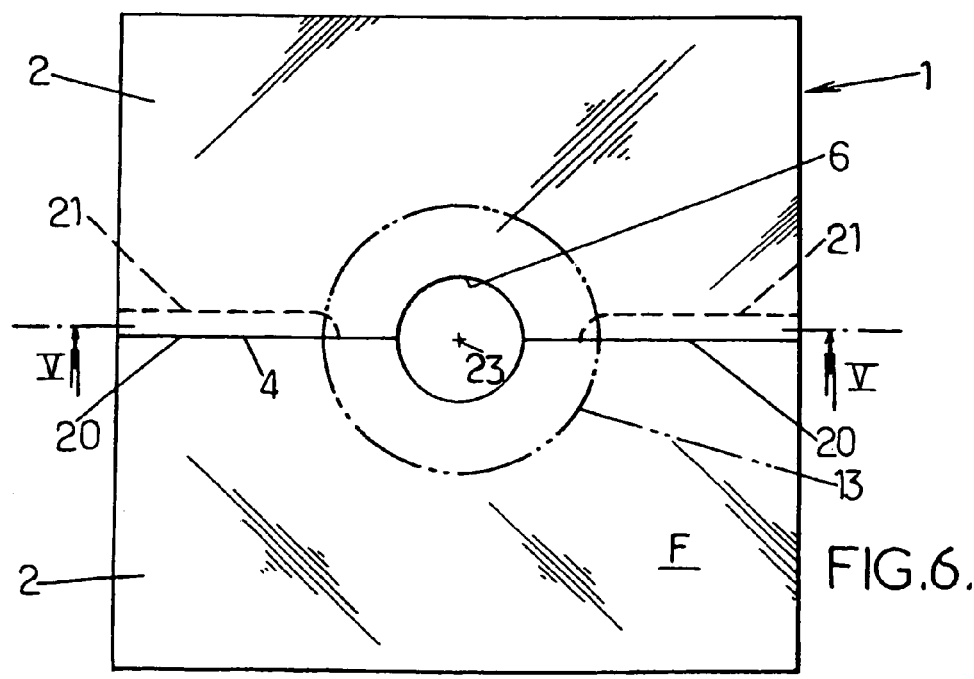
FIG. 6 is a view from above of a mold in which one of the portions is that of FIG. 5.

Referring first of all to FIGS. 5 and 6, according to the invention the mold 1 of the blow-molding installation described above with reference to FIGS. 1 to 4 is provided with leakage means of relatively large cross section (considered relative to the section offered for the fluid by the gap likely to appear between the mold portions during blowing). These leakage means are provided from at least one contact face 20 of at least one of the portions 2 and extend as far as the outside of the mold beyond the seating (seal 13) of the bell 11 of the blowing nozzle 12. Furthermore, these leakage means preferably are constructed in such a way as to lie on each side of the molding cavity 5.

It would admittedly, for this purpose, be possible to hollow out at least one canal (or even two canals situated one on each side of the molding cavity 5) through the portion 2, from the contact face 20 as far as an external face of the mold portion with, for example, it running approximately perpendicular to the face 20. However, such an arrangement jeopardizes the integrity of the mold portion and in order to avoid this disadvantage, it is preferable to have recourse to the following embodiment.

As illustrated in FIGS. 5 and 6, the leakage means comprise at least one channel 21 hollowed out from the contact face 20 of at least one of the mold portions 2, said channel running approximately radially (that is to say approximately at right angles to the axis 22 of the cavity 5 of the mold). As a preference, as illustrated, two channels 21 are provided, one situated on each side of the molding cavity 5.

Each channel 21 straddles the seating (seal 13) of the bell 11 of the blowing nozzle 12. At its radially outer end 25, it opens onto a face of the portion; its radially inner end 24 is blind, so as not to place the cavity 5 in communication with the atmosphere.

As a preference, each channel 21 is situated in the upper part of the mold portion 2, at the height of the shoulder or preferably of the neck of the imprint of the container which imprint is defined by the cavity 5, so as to be situated as close as possible to where the pressurized blowing fluid enters as the mold portions part, so that this fluid is removed to the outside as quickly as possible.

Finally, each channel has a cross section that is relatively large by comparison with the passage surface offered by the gap likely to appear, for example preferably of the order of 10 times as great.

The solution proposed by the invention is easy to implement because it requires only machining operations that are simple to perform. The embodiment illustrated in FIGS. 5 and 6, which calls upon one or preferably two channels, requires just one milling operation.

Figure 7:
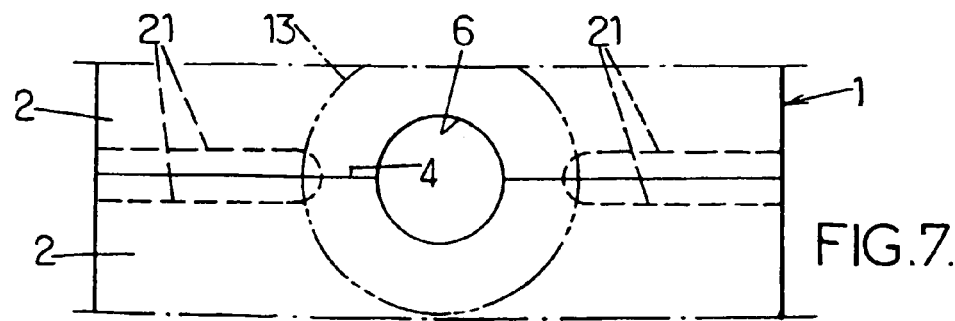
FIG. 7 is a part view from above of a mold illustrating an alternative form of embodiment of the arrangement of FIG. 6.

In order to avoid the asymmetry that there is between the two mold portions 2 that make up at least part of the mold 1 in FIGS. 5 and 6, it is preferable to provide two channels 21 on each portion 2, these being situated one on each side of the molding cavity 5, as illustrated in FIG. 7. Thus, two opposing channels 21, one belonging to each of the two portions 2, together define a radial canal opening to the outside.

If the presence of the channels 21 becomes needless (for example because the molds are arranged in such a way that prevents the mold portions from parting during blowing), it is easy to plug the channels and to reproduce a correct surface finish at these locations which do not contribute directly to the molding process, so that the mold portions can be kept in service in spite of everything.

The arrangements according to the invention find a particularly advantageous application in the case of molds made of aluminum alloy in which a neck plate made of steel needs to be provided on the face F, both so as to give the seal of the bell of the blowing nozzle a perfectly flat seating surface that is rigid and wears less readily than the aluminum face of the mold and so as to increase the ability to use the mold for containers with necks of different diameters. Moreover, it is precisely in the case of such light aluminum alloy molds that a parting of the mold portions during blowing is likely to occur if the mold portions are not or are insufficiently stiffened (mechanical reinforcement of the support, pneumatic compensation from behind, etc.).

Figure 8:
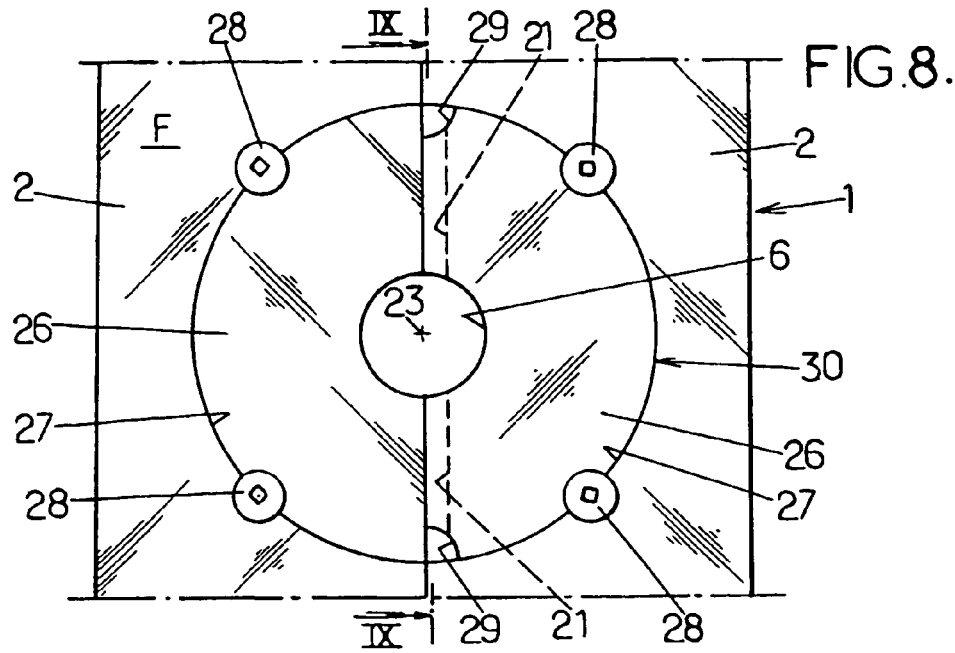
FIG. 8 is a part view from above of a mold with a neck plate, illustrating another embodiment of the invention.
Figure 9:
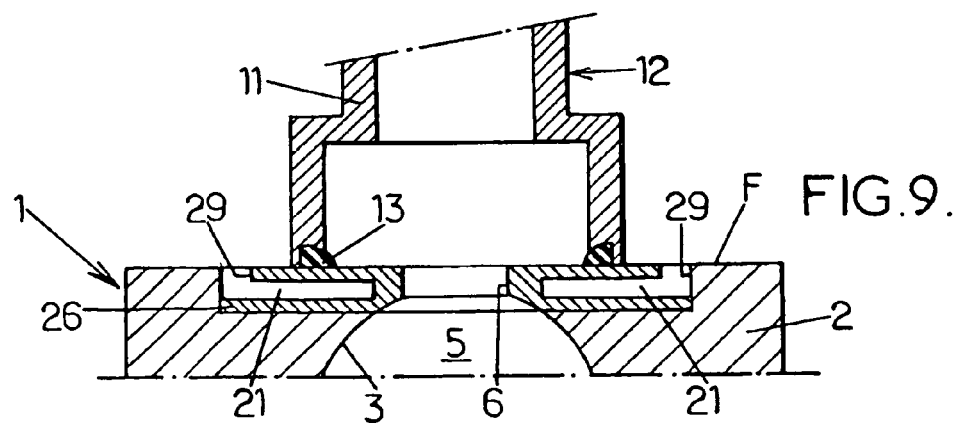
FIG. 9 is a part view, in section on IX—IX of FIG. 10, of a mold portion of FIG. 8, with the bell nozzle in the blowing position.

FIGS. 8 and 9 illustrate, under the same conditions as FIGS. 5 and 6, a mold arrangement with a neck plate 30. In practical terms, the neck plate 30 is produced in the form of two neck half-plates 26, for example in the shape of half-rings, which are set into counterbores 27 of complementary shapes cut into the face F of the respective portions 2. Immobilizing means such as screws 28 hold the half-plates 26 in place.

The two neck half-plates 26 have respective semicircular notches hollowed out from their collaborating faces so that these notches combined together form the aforesaid passage 6 extending the molding cavity 5 at the top in order to leave space for the neck of the parison.

Because the neck plate 30 is intended to act as a rigid seating for the annular seal 13 of the bell 11 of the blowing nozzle 12, this plate 30 has a diameter greater than that of the seal 13.

This being the case, it is highly advantageous to provide the channels 21 in at least one neck half-plate 26, under the same conditions as those mentioned above, except that the radially outer end of each channel is situated on the edge face of the half-plate and except that this end is placed in communication with the outside via a well 29 hollowed vertically from directly above it from the upper face of the half-plate 26.

As before, it is advantageous for the two neck half-plates 26 to be identical so as not to complicate the assembling of the mold and the holding of spares in stores. As a result, provision is made, as illustrated in FIG. 10, for the two neck half-plates 26 to be equipped with channels 21 opening via respective wells 29.

Figure 10:
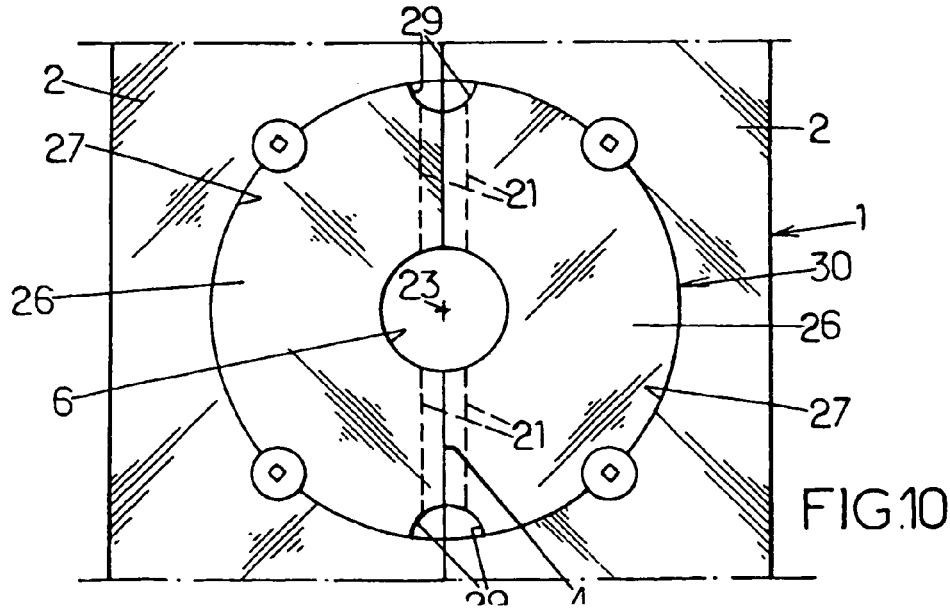
FIG. 10 is a part view from above of a mold with a neck plate, illustrating a preferred embodiment of the invention.

The arrangements that have just been described with regard to FIGS. 8 to 10 are highly beneficial because they now relate not to the mold portions themselves, but to a removable part thereof. It is thus possible for existing molds to be equipped in accordance with the invention simply by replacing the neck half-plates, or conversely for molds thus arranged to be unequipped if the parting of the mold portions is eliminated.

What is more, the machining of the neck half-plates to provide them with channels 21 and wells 29 (which in theory are simple notches hollowed out from the corner where the channel 21 meets the external periphery edge face of the half-plates 26) is easy to perform by milling, and therefore not very expensive. This work can be performed on existing neck half-plates.

Finally, and this of no lesser importance, the channels 21 are situated in the immediate vicinity of the face F of the mold so that if the portions part, the fluid which begins to enter the gap is immediately collected and discharged by the channels 21.

The invention claimed is:

1. An installation for blow-molding or stretch-blow-molding containers, particularly bottles, from parisons made of thermoplastic polymer such as PET, this installation comprising:

on the one hand, at least one blowing mold comprising two mold portions that can be brought together so that they touch via respective contact faces and then define at least part of a molding cavity opening onto one face of the mold via a neck passage able to receive the neck of the parison which is able to rest, via an annular flange, against said face of the mold, and, on the other hand, blowing means including a blowing nozzle of the bell type able to be brought to bear frontally in a sealed manner against said face of the mold, sitting over the neck of the parison, said two mold portions being able to move apart during the blowing under the effect of the pressure of the blowing fluid with the formation of a gap between the aforesaid contact faces of the two mold portions, wherein leakage means of relatively large cross section, when considered by comparison with the cross section offered to the fluid by the aforesaid gap, are provided from at least one contact face of at least one mold portion and extending beyond the seating for the bell of the blowing nozzle, whereby the high-pressure blowing fluid that can enter the gap is removed at least for the most part by said leakage means and only a small proportion at most of said fluid can, at a relatively low pressure, get as far as the molding cavity.

2. The installation as claimed in claim 1, wherein leakage means are made from at least one contact face of at least one mold portion on each side of the molding cavity.

3. The installation as claimed in claim 1, wherein the leakage means comprise at least one channel hollowed out from the contact face of at least one mold portion between the inside and the outside of the seating for the bell of the blowing nozzle, said channel being blind at its interior end.

4. The installation as claimed in claim 3, wherein the leakage means comprise at least two channels hollowed out respectively from the facing contact faces of the two mold portions.

5. The installation as claimed in claim 1, wherein the leakage means have a cross section approximately 10 times as great as the cross section offered to the passage of the blowing fluid by the portion of the gap over which the bell sits.

6. The installation as claimed in claim 1, wherein the leakage means are situated near said face of the mold.

7. The installation as claimed in claim 6, wherein the leakage means are provided at said neck passage able to accommodate the neck of the parison.

8. The installation as claimed in claim 1, in which said face of the mold is equipped with a removable neck plate pierced with a passage hole for the neck of the parison and against which the bell of the nozzle is brought to bear frontally in a sealed manner during blowing, said neck plate being formed of two neck half-plates borne respectively via the two portions, and wherein the leakage means are provided in said neck plate.

9. The installation as claimed in claim 8, wherein the leakage means comprise two channels hollowed out from the contact face of at least one neck half-plate, one on each side of the half-passage it comprises, each channel being blind at its inner end and, at its other end beyond the seating of the bell nozzle, communicating with a transverse well opening into the upper face of the neck half-plate.

10. The installation as claimed in claim 9, wherein the transverse well is defined by a notch hollowed out from the end of said contact face of the neck half-plate in the corner where said contact face meets the adjacent edge face.

\* \* \* \* \*